Sept. 4, 1934.  R. E. WALKER  1,972,503
METHOD OF PRODUCING VARIEGATED ARTICLES OF PLASTIC MATERIAL
Filed Jan. 11, 1932

INVENTOR:
Roland E. Walker
By John E. R. Hayes
ATTORNEY:

Patented Sept. 4, 1934

1,972,503

UNITED STATES PATENT OFFICE 1,972,503

METHOD OF PRODUCING VARIEGATED ARTICLES OF PLASTIC MATERIAL

Roland E. Walker, North Brookfield, Mass., assignor to Quabaug Rubber Company, North Brookfield, Mass., a corporation of Massachusetts Application January 11, 1932, Serial No. 585,853

3 Claims. (Cl. 18—61)

The invention relates to a method of producing variegated articles of plastic material such as rubber or rubber compositions, and especially such as are made in sheet form as flooring material, or tiling.

The method comprises essentially an improvement to that method in which the article is produced from a base sheet of the plastic material prepared by running through a mill, and to which mottling strips for giving color are applied, after which the sheet with applied strips is run through a mill one or more times, oftentimes through a calender, and cut sections of the sheet then cured, as by vulcanizing, under pressure. This is an old and well known method, and much material is made by practising it. The method has, however, its limitations which I seek to overcome by the present improvement. Among these limitations may be mentioned the following: The action of rolls on the coloring material tends to pull the mottling along the surface of the sheet and accordingly to drag out and lengthen the colors, making smooches often of considerable length which are in such radical contrast to the surrounding coloring as to be disfiguring and necessitate such portion of the sheet so colored being thrown out and used only as seconds, if used at all. The coloring is largely a surface coloring. There is no uniformity in the applied colors or mottling effect as it cannot be controlled. Another difficulty resides in the fact that air pockets, blisters and low spots are found in the product which cause rejections.

The object of the invention is to eliminate the objections or limitations previously referred to, and to obtain a resulting material or product in which there is great uniformity in the coloring or mottling effect, and which effect is controllable, permitting of great variation in the coloring of the resultant product; a product in which all disfiguring smooches are substantially eliminated, as also air pockets, blisters and low spots; and a product, also, in which the greater part of the coloring extends entirely through the product.

The invention can best be seen and understood by reference to the drawing in which the various figures are illustrative of elements and steps employed in practising the method, and in which—

The present method of producing the variegated article is obtained by first practising the early steps of the method as previously practised. A base sheet of plastic material or rubber is prepared upon a mill and to this sheet the mottling strips are applied in the usual manner. The sheet with applied strips is then run one or more times through the mill, and preferably through a calender. The rolls of the mill or calender through which the sheet is run will impart an appreciable grain to the sheet and the colorings will appear thereon as streaks running for the most part in the general direction of the grain.

Figure 1:
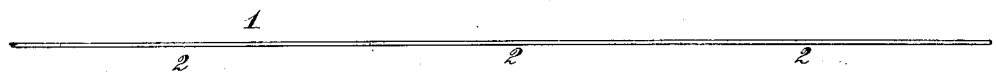
Figure 1 shows in side edge elevation a sheet of plastic material to which coloring strips have been applied as will later be explained.
Figure 2:
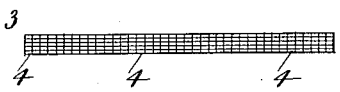
Fig. 2 shows in side elevation a pile made from sections of the sheet shown in Fig. 1 and is illustrative, also, of manner of cutting the pile into strips.
Figure 3:
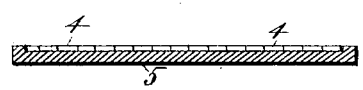
Fig. 3 shows in cross section a mould with contained strips cut from the pile shown in Fig. 2 for curing or vulcanizing.

In the drawing, 1 represents the sheet thus obtained. (Fig. 1.) This sheet is now cut to form sections or slabs 2 and these are piled one on top of the other to form a laminated pile 3. (Fig. 2.) To obtain the best results the sections or slabs forming the laminae in the pile should be so arranged that the grain for all will run in the same direction. Strips 4 are now cut from the pile 3 by crosscutting it in any suitable manner as by a knife. The crosscutting may be in any desired direction though preferably in a direction transverse the grain and colorings. The strips 4 are cut to have a thickness depending upon the thickness of the product desired to be obtained, while their width depends upon the thickness of the pile 3, and when cut transverse to the grain, the latter is disposed endwise to the cut surfaces of the strips and runs through the thickness thereof from surface to surface. The strips 4 are now placed in a mould 5 (Fig. 3) preparatory to curing, as by vulcanizing, under pressure. The strips are arranged side by side in the mould with abutting edges to form an extended sheet the surfaces of which are formed by the cut surfaces of the strips and, inasmuch as the strips are still in a plastic state, they will readily adhere to one another. Pressure is then applied to the laid strips, and the strips cured, or vulcanized, in the usual manner. The application of pressure incident to the curing or vulcanizing process tends to press the edges of the strips into contact with one another so that the individuality of the strips disappears after curing or vulcanizing, the laid strips forming an integral sheet.

In the product thus obtained there is a great uniformity in the colored or mottled effect. All unsightly and disfiguring smooches on the surface are eliminated for crosscuttings from these smooches will only appear. The mottling can be controlled to obtain either a relatively fine or relatively coarse mottling or intermediate effects by varying the coloring applied to the base sheet. Air bubbles, blisters and low spots are substantially eliminated. Ninety per cent. or more of the individual colorings will extend entirely through the product.

Figure 4:
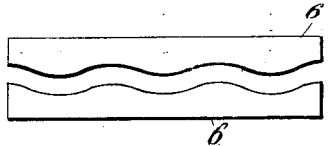
Fig. 4 shows in side elevation a tentative form of die used in practising a modified step of the method.
Figure 5:
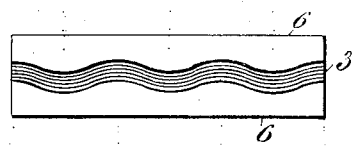
Fig. 5 shows in side elevation the same die with contained pile of plastic material as shown in Fig. 2 for imparting an undulated effect to said pile.
Figure 6:
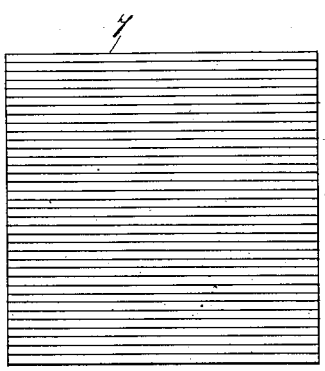
Fig. 6 is a plan of the plastic pile after removal from the die shown in Fig. 5 and is illustrative of manner of cutting the pile into strips.
Figure 7:
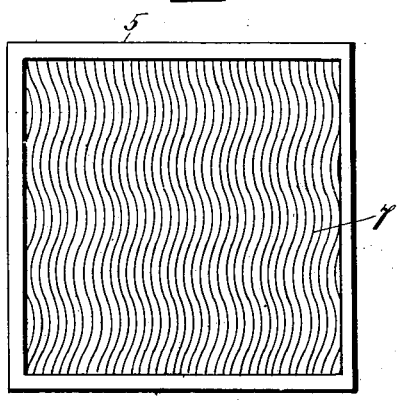
Fig. 7 is a plan of assembled strips cut from the pile shown in Fig. 6 when contained in a mould for curing or vulcanizing.

Peculiar swirling or undulated effects may be obtained in the resultant product by imparting an undulated form to the pile 3. This may be done by a die 6 as shown in Figs. 4 and 5. Strips 7 are then cut from the undulated pile 3 according to the manner of cutting illustrated in Fig. 6 after which these strips are assembled in a mould for curing or vulcanizing the same as before. The swirling or undulated effect imparted to the resultant product will be seen by reference to Fig. 7 where the strips are shown assembled in the curing or vulcanizing mould.

Figure 8:
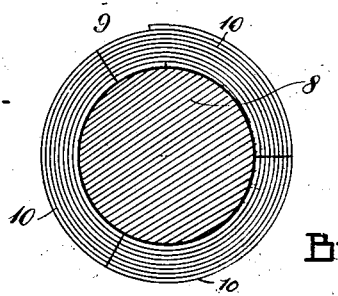
Fig. 8 is a cross section of a cylinder with sheet of plastic material wound thereon to form a pile.

Instead of piling sections or slabs 2 from a sheet 1 to form a laminated pile 3 as previously explained, the sheet may be wound on a cylinder 8 of relatively large diameter as shown in Fig. 8 to form a laminated pile in the form of a tube 9 and sections 10 may be cut from this tube to form laminated piles from which crosscuttings are made, and the strips assembled in a mould and cured as previously described.

By practicing the method mottling, graining, streaking or veining effects may be obtained in a flooring or tiling which will differ in appearance from any type of flooring or tiling that has heretofore been obtained inasmuch as every individual piece of mottling, streaking, graining or veining will stand out sharp and clear cut, distinct from the surrounding base color in which it is incorporated, or will blend into soft tone effects therewith if desired. It permits of the elimination to a considerable degree in a mottled, streaked or veined sheet of the showing of the plain base color when such type of product is demanded. It permits of the making of a product according to a required specification or standard, the product running with remarkable uniformity to any required specification or standard. Excellent imitations can, also, be obtained of finely grained woods, an effect hitherto considered impossible of achievement.

Having thus fully described my invention, I claim and desire to secure by Letters Patent of the United States:

1. The method of preparing an article of manufacture from vulcanizable plastic material which comprises the formation of a base sheet from the plastic material, applying to the base sheet mottling strips of contrasting color, manipulating the sheet with applied strips whereby a grain will be imparted to the sheet and the sheet will become irregularly streaked with said contrasting colors running in the direction of the grain, crosscutting said sheet to form strips having the grain disposed endwise to the cut surfaces thereof and running through the thickness thereof from surface to surface, arranging said strips side by side in edge-abutting relationship to form an extended sheet the surfaces of which are formed by the cut surfaces of the strips, and vulcanizing said strips together under pressure into an integral sheet.

2. The method of preparing an article of manufacture from vulcanizable plastic material which comprises the formation of a base sheet from the plastic material, applying to the base sheet mottling strips of contrasting color, manipulating the sheet with applied strips whereby a grain will be imparted to the sheet and the sheet will become irregularly streaked with said contrasting colors running in the direction of the grain, making a laminated pile from the grained and colored sheet with the grain of the laminae all running in the same directions, crosscutting said pile in a direction transverse to the grain and colorings to form strips having the grain disposed endwise to the cut surfaces thereof and running through the thickness thereof from surface to surface, arranging said strips side by side in edge-abutting relationship to form an extended sheet the surfaces of which are formed by the cut surfaces of the strips, and vulcanizing said strips together under pressure into an integral sheet.

3. The method of preparing an article of manufacture from plastic material which comprises the formation of a base sheet from the plastic material, applying to the base sheet mottling strips of contrasting color, manipulating the sheet with applied strips whereby the sheet will become irregularly streaked with said contrasting colors, making a laminated pile from the sheet so colored, pressing said pile into an undulated form, crosscutting said undulated pile to obtain undulated strips therefrom, and curing said strips under pressure in the usual manner.

ROLAND E. WALKER.